(12) United States Patent
Marquette

(10) Patent No.: US 12,020,485 B2
(45) Date of Patent: Jun. 25, 2024

(54) METHOD FOR THE EMERGENCY SHUTDOWN OF HAND-GUIDED TOOLS, AND HAND-GUIDED TOOL

(71) Applicant: Würth International AG, Chur (CH)

(72) Inventor: Adrien Marquette, Schwäbisch Hall (DE)

(73) Assignee: Würth International AG, Chur (CH)

( * ) Notice: Subject to any disclaimer, the term of this patent is extended or adjusted under 35 U.S.C. 154(b) by 141 days.

(21) Appl. No.: 16/856,552

(22) Filed: Apr. 23, 2020

(65) Prior Publication Data

US 2020/0342237 A1    Oct. 29, 2020

(30) Foreign Application Priority Data

Apr. 24, 2019   (EP) ..................... 19170854

(51) Int. Cl.
*G06V 20/52* (2022.01)
*F16P 3/00* (2006.01)
*G06T 7/70* (2017.01)
*G06V 40/10* (2022.01)
*G08B 21/02* (2006.01)
*H04N 7/18* (2006.01)
*H04N 13/239* (2018.01)
*H04N 23/60* (2023.01)

(52) U.S. Cl.
CPC .............. *G06V 20/52* (2022.01); *F16P 3/001* (2013.01); *G06T 7/70* (2017.01); *G06V 40/10* (2022.01); *G08B 21/02* (2013.01); *H04N 7/18* (2013.01); *H04N 13/239* (2018.05); *H04N 23/60* (2023.01); *G06T 2207/30196* (2013.01)

(58) Field of Classification Search
None
See application file for complete search history.

(56) References Cited

U.S. PATENT DOCUMENTS

| | | | |
|---|---|---|---|
| 5,309,227 A | * | 5/1994 | Inoue ..................... H04N 7/18 348/441 |
| 6,793,652 B1 | * | 9/2004 | Whitman ............... A61B 17/00 606/1 |
| 7,924,161 B1 | | 4/2011 | Spindel et al. |
| 7,924,164 B1 | | 4/2011 | Staerzl |

(Continued)

FOREIGN PATENT DOCUMENTS

| | | |
|---|---|---|
| EP | 2257031 A1 | 12/2010 |
| WO | 2016096193 A1 | 6/2016 |
| WO | 2016146194 | 9/2016 |

*Primary Examiner* — Michelle M Entezari Hausmann
(74) *Attorney, Agent, or Firm* — Boyle Fredrickson S.C.

(57) ABSTRACT

The invention relates to a method for the emergency shutdown of hand-guided tools having a drive, wherein the hand-guided tool is connected mechanically to at least one camera and the camera and/or the tool is/are provided with an evaluation unit having image processing software, in which the following steps are provided: activating the camera, monitoring a predefined danger area of the hand-guided tool by means of the camera, processing and evaluating the captured image data by means of the evaluation unit and the image processing software with regard to the presence of a human body part in the danger area, and generating a warning signal, slowing down the drive of the hand-guided tool and/or stopping the drive of the hand-guided tool if a human body part is present in the danger area.

18 Claims, 1 Drawing Sheet

(56) References Cited

U.S. PATENT DOCUMENTS

| | | | | |
|---|---|---|---|---|
| 9,404,363 B2* | 8/2016 | Rosenstern | | E21F 17/18 |
| 9,513,606 B1* | 12/2016 | Larsen | | G05B 9/02 |
| 10,514,672 B1* | 12/2019 | Brooks | | G05B 19/0428 |
| 10,535,199 B1* | 1/2020 | Bond | | G06T 15/08 |
| 10,656,602 B2* | 5/2020 | Castelli | | G05B 9/02 |
| 10,901,215 B1* | 1/2021 | Newcombe | | G02B 27/0172 |
| 2003/0004908 A1* | 1/2003 | Linthicum | | G06F 30/00 |
| | | | | 706/45 |
| 2003/0133614 A1* | 7/2003 | Robins | | G08B 13/19676 |
| | | | | 348/143 |
| 2004/0226424 A1* | 11/2004 | O'Banion | | B27G 19/02 |
| | | | | 83/397 |
| 2005/0010808 A1* | 1/2005 | Wixson | | H04N 21/2187 |
| | | | | 726/26 |
| 2007/0194944 A1* | 8/2007 | Galera | | F16P 3/14 |
| | | | | 340/686.6 |
| 2008/0119958 A1* | 5/2008 | Bear | | A61J 7/0481 |
| | | | | 700/244 |
| 2010/0289662 A1* | 11/2010 | Dasilva | | G01V 15/00 |
| | | | | 340/686.6 |
| 2013/0057694 A1* | 3/2013 | Petricoin, Jr. | | H04N 7/18 |
| | | | | 348/155 |
| 2013/0201292 A1* | 8/2013 | Walter | | F16P 3/14 |
| | | | | 348/46 |
| 2013/0336554 A1* | 12/2013 | Lewis | | G06V 20/60 |
| | | | | 382/128 |
| 2014/0275778 A1* | 9/2014 | Gunday | | A61B 1/00135 |
| | | | | 600/109 |
| 2016/0077621 A1* | 3/2016 | Min | | G06F 1/1677 |
| | | | | 345/173 |
| 2016/0273708 A1* | 9/2016 | Voong | | B23D 59/001 |
| 2017/0224888 A1* | 8/2017 | Hickey | | A61M 3/0279 |
| 2017/0252939 A1* | 9/2017 | Blenkinsopp | | B27B 5/38 |
| 2017/0282346 A1* | 10/2017 | Valentini | | B24B 23/028 |
| 2017/0353847 A1* | 12/2017 | Coulis | | B25F 5/00 |
| 2018/0065232 A1* | 3/2018 | Mueckl | | G01S 15/42 |
| 2019/0013763 A1* | 1/2019 | Woyciesjes | | B21J 15/26 |
| 2019/0063679 A1 | 2/2019 | Mergener | | |
| 2019/0122047 A1* | 4/2019 | Uemura | | G06F 1/163 |
| 2019/0262993 A1* | 8/2019 | Cole | | B25J 9/1676 |
| 2019/0378264 A1* | 12/2019 | Braune | | G06V 20/52 |
| 2020/0352554 A1* | 11/2020 | Tully | | A61B 34/74 |
| 2021/0104006 A1* | 4/2021 | Green | | G06T 1/0014 |
| 2024/0033923 A1* | 2/2024 | Jung | | B25J 9/1676 |

* cited by examiner

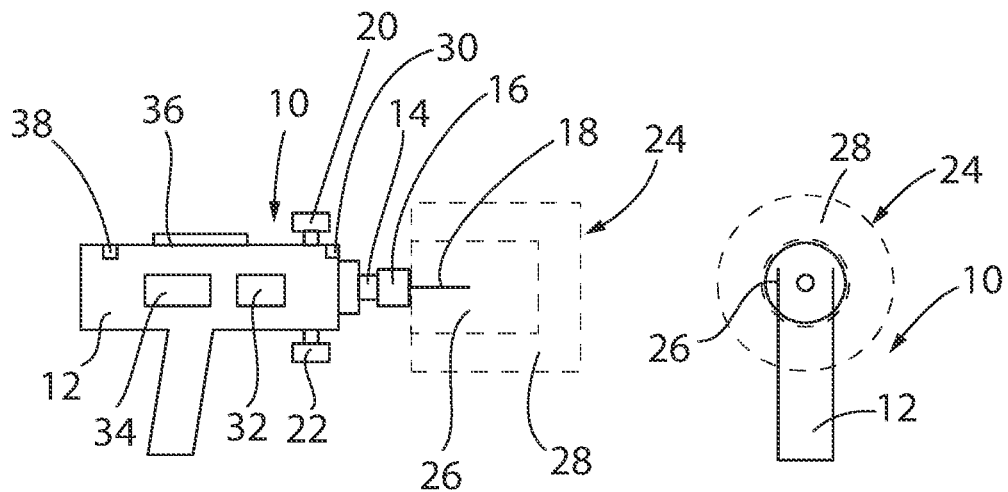
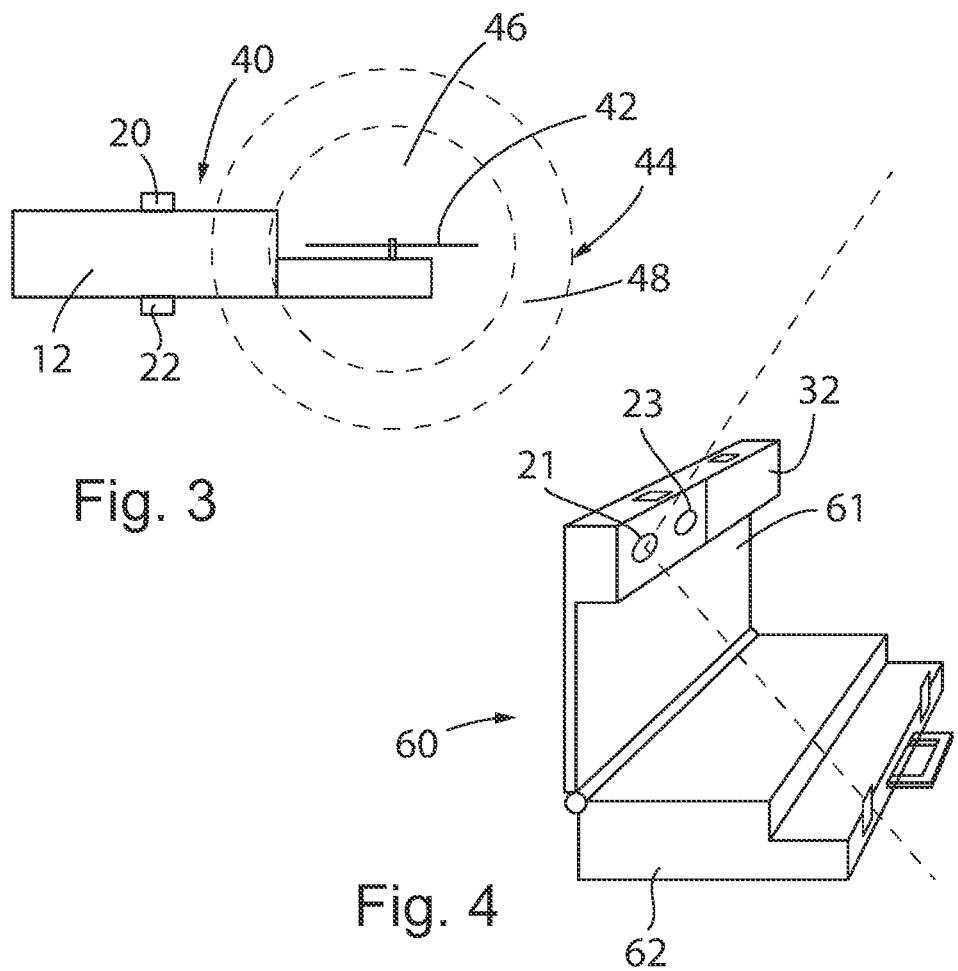

METHOD FOR THE EMERGENCY SHUTDOWN OF HAND-GUIDED TOOLS, AND HAND-GUIDED TOOL

FIELD OF THE APPLICATION

The invention relates to a method for the emergency shutdown of hand-guided tools having a drive, wherein the hand-guided tool is connected, in particular mechanically, to at least one camera and the camera and/or the tool is/are provided with an evaluation unit having image processing software. The invention also relates to a hand-guided tool having a motor drive.

BACKGROUND

The safety of hand-guided tools having a motor drive is intended to be improved with the invention.

SUMMARY

For this purpose, a method is provided according to the invention for the emergency shutdown of hand-guided tools having a drive, wherein the hand-guided tool is connected, in particular mechanically, to at least one camera and the camera and/or the tool is/are provided with an evaluation unit having image processing software, with the steps of activating the camera, monitoring a predefined danger area of the hand-guided tool by means of the camera, processing and evaluating the captured image data by means of the evaluation unit and the image processing software with regard to the presence of a human body part in the danger area, and generating a warning signal and/or slowing down the drive of the hand-guided tool and/or shutting down the drive of the hand-guided tool if a human body part is present in the danger area.

The invention ensures a very high level of safety at work in the case of hand-guided tools also. Whereas, in the case of machinery, such as die cutters for perforating or reshaping sheet metal, two actuation buttons are present which must be pressed and held simultaneously to trigger the die-cutting or reshaping, corresponding safety devices are not known in the case of hand-guided tools. In the use of hand-guided tools, it is not unusual for the hand-guided tool, for example a one-hand angle grinder or a drill, to be held with one hand and for the workpiece that is to be processed to be held or guided with the other hand. With the invention, it can now be determined whether a human body part is moving into a danger area of the hand-guided tool. If so, for example depending on further parameters also, either only a warning signal can be output, the drive of the hand-guided tool can be slowed down or powered down and/or the drive of the hand-guided tool can be completely shut down. A very high level of safety at work can thereby be ensured in the case of hand-guided tools also. Electrically, pneumatically and hydraulically driven tools or combustion-engine-driven tools, for example, in particular drills, screws, grinders, saws, hot-air devices, also with a flame, power saws and the like, are designated as hand-guided tools having a drive according to the invention. Hand-held tools which are movable and not connected to a machine base, with the exception of an electrical supply cable, are also considered hand-guided tools. The danger area can also be monitored after the drive has been shut down, for example until a tool insert has cooled down or until a sharp-edged tool insert has been removed or covered.

In one development of the invention, the capture and processing of signals from at least one further sensor on or in the hand-guided tool is provided by means of the evaluation unit and the consideration of the signals from the at least one further sensor is provided in the evaluation of the captured image data with regard to the presence of a human body part in the danger area.

By means of further sensors, the reliability of the detection of a human body part can be increased by means of the at least one camera. This applies particularly if work is carried out using gloves. An additional measured value indicating the presence of a human body part can then be generated by means of a further sensor.

An infrared sensor, for example, a sensor operating with high-frequency electromagnetic radiation, an ultrasound sensor, a temperature sensor and/or a position sensor for detecting a position of the hand-guided tool in the space can be used as a further sensor.

In one development of the invention, the coverage of the danger area is provided by means of at least two cameras, in particular 3D cameras, disposed with different angles of view onto the danger area and the processing and evaluation of the data from the at least two cameras are provided by means of the evaluation unit and the image processing software.

By providing at least two cameras, for example, a section of the danger area can be prevented from being hidden by a housing of the hand-guided tool. In addition, spatial image data can also be created in order to be able to monitor the danger area reliably and correctly in its three-dimensional extension also.

In one development of the invention, the activation of the camera is provided by moving the hand-guided tool and/or by activating the drive of the hand-guided tool.

It is normally necessary for an operator to intervene in the danger area, for example in order to exchange a tool insert, when the drive is stopped and stands still. However, if the drive is then activated, the danger area must be monitored.

In one development of the invention, the activation of the camera is provided by unfolding the camera.

The camera can be disposed in a foldable manner on the housing of the hand-guided tool in order to be tucked away, for example, during transportation of the camera. The camera or plurality of cameras can simply be unfolded from the housing and then activated, and the danger area can be monitored.

In one development of the invention, a danger area can be defined either in the shape of an imaginary sphere in the centre of which, in particular, a tool insert of the hand-guided tool is disposed, or in the shape of an imaginary cylinder on the central longitudinal axis of which, in particular, a tool insert of the hand-guided tool is disposed.

The shape of the danger area can also be changed, for example depending on the type of tool insert that is used. If a drill is used as a tool insert, a cylindrical danger area is appropriate which extends from the end of the drill a little further in the intended direction of drilling. If a grinding disc or cutter, for example, is used as a tool insert, a spherical danger area is appropriate. In the case of a hot-air blower, no tool insert is provided, the danger area being selected there so that a central longitudinal axis of the hot-air flow defines the central longitudinal axis of the cylindrical danger area.

In one development of the invention, the subdivision of the danger area into an inner danger area and an outer danger area is provided and the generation of a warning signal and/or the slowing down of the drive is/are provided if a human body part is present in the outer danger area and the shutdown of the drive of the hand-guided tool is provided if a human body part is present in the inner danger area.

A handling of the hand-guided tool can be significantly improved by subdividing the danger area into a plurality of sections, wherein more than two sections of the danger area can also be provided according to the invention. If, for example, a hand of the operator simply moves into the first, outer danger area, only a warning signal is output and the operator thereby has the opportunity to withdraw his hand from the danger area. However, he does not have to interrupt the currently running work step, since the drive of the hand-guided tool is not yet stopped. Only if a human body part is moved into the second, inner danger area is the drive of the hand-guided tool or a movement of a tool insert of the hand-guided tool stopped immediately so that the tool insert no longer poses a risk of injury.

In one development of the invention, the creation of documentation of work steps carried out with the hand-guided tool is provided using the image data captured by means of the at least one camera.

Work steps performed can thereby be documented in a very simple manner.

In one development of the invention, the consideration of data from at least one further sensor, in particular a position sensor for detecting a position of the hand-guided tool in the space, is provided in the creation of documentation, and the consideration of data from the hand-guided tool, in particular the device number, rotational speed, torque, type and dimensions of a tool insert of the hand-guided tool, and/or the consideration of data from an operator of the hand-guided tool is/are provided in the creation of the documentation. By means of a position sensor, e.g. the position and depth of a borehole made by a hand-guided drill can be monitored and documented.

The underlying object of the invention is also achieved by a hand-guided tool having a drive in which at least one camera connected, in particular mechanically, to the hand-guided tool to monitor a predefined danger area of the hand-guided tool, an evaluation unit having image processing software for processing and evaluating the captured image data by means of the evaluation unit and the image processing software with regard to the presence of a human body part in the danger area, and a control unit to generate a warning signal and/or to slow down a drive of the hand-guided tool and/or to stop the drive of the hand-guided tool if a human body part is present in the danger area are provided. The image processing software is software into which, for example, an image or an image sequence or a live image or a video are input and which then processes the image or the image sequence or the live image or the video and outputs information derived therefrom. An optical image, an IR image, a UV image or a point cloud can be considered as an image or image sequence or live image or video for an input of the image processing software. The image processing software can be a neural network and/or can operate on the basis of artificial intelligence for a processing by means of the image processing software. Control signals for the hand-guided tool, for example generating the warning signal and/or slowing down the drive of the hand-guided tool and/or stopping the drive of the hand-guided tool due to a human body part in the danger area can be provided for an output of the image processing software.

In one development of the invention, the hand-guided tool has at least one further sensor, in particular an infrared sensor, a sensor operating with high-frequency electromagnetic radiation, an ultrasound sensor and/or a position sensor to detect a position of the hand-guided tool in the space, and the hand-guided tool has means for forwarding the signals from the at least one further sensor to the evaluation unit.

In one development of the invention, a memory for storing data and an interface for reading data are provided.

According to the invention, an arrangement having a hand-guided tool and at least one separate camera is provided, wherein a communication connection exists between the hand-guided tool and the at least one separate camera and the at least one separate camera monitors a danger area of the hand-guided tool.

Along with the at least one separate camera, the evaluation unit and/or the control unit can also be designed as separate and therefore not as part of the hand-guided tool. If a human body part enters the danger area of the hand-guided tool, the hand-guided tool can generate the warning signal and/or can slow down the drive of the hand-guided tool and/or can stop the drive of the hand-guided tool by means of the communication connection between the at least one separate camera, the evaluation unit, the control unit and the hand-guided tool.

In one development of the invention, a case is provided for the hand-guided tool in which the at least one separate camera is disposed, wherein the case is positioned so that the danger area of the hand-guided tool can be monitored. The evaluation unit and/or the control unit can be disposed in the case, particularly in a lid of the case. The lid can preferably be designed as foldable and settable at an angle of inclination. The case can then be positioned so that the at least one separate camera is aligned in such a way that work steps to be carried out by means of the hand-guided tool can be captured and a danger area of the hand-guided tool can be monitored.

BRIEF DESCRIPTION OF THE DRAWINGS

Further features and advantages of the invention can be found in the claims and the following description of preferred embodiments of the invention in connection with the drawings. Individual features of the different embodiments presented and described can be combined with one another in any way without departing the scope of the invention. The same applies to the combination of individual features without further individual features in connection with which they are described. In the drawings:

FIG. 1 shows a schematic representation of a power hand drill according to the invention in a side view, FIG. 2 shows the power hand drill from FIG. 1 in a schematic front view, FIG. 3 shows a schematic side view of a one-hand angle grinder according to the invention, and FIG. 4 shows a schematic view of a case for a hand-guided tool according to the invention.

DETAILED DESCRIPTION

FIG. 1 shows a hand-guided tool 10 according to the invention which is designed as a power hand drill with an electric motor drive. According to the invention, the motor drive can also be designed, for example, as a compressed air motor, hydraulic motor, combustion engine or the like.

The power hand drill has a housing 12 in which an electric motor (not shown) is disposed. A drive shaft 14 extends from the housing to a drill chuck 16 in which a tool insert 18 in the form of a twist drill bit is accommodated.

Two cameras 20, 22 are mechanically connected to the housing of the power hand drill. The cameras in each case have an angle of view onto the tool insert 18. The first camera 20 is disposed on an upper side of the housing and the second camera 22 is disposed on a lower side of the housing 12. The two cameras 20, 22 thus have a different angle of view onto the tool insert 18 around which a danger area 24 is defined. The danger area 24 is indicated in FIG. 1 by means of broken lines and has an inner danger area 26 and an outer danger area 28. The danger area 24 is not defined by mechanical demarcations or the like, but is a predefined space around the tool insert 18. If a human body part moves into the danger area 24, a risk of injury exits. Depending on the type of the tool 18, for example also depending on the type of use of the hand-guided tool, the danger area 24 can be defined differently in terms of size and shape.

In the embodiment shown in which the hand-guided tool 10 is a power hand drill and the tool insert is a twist drill bit 18, the danger area 24 has a cylindrical shape. A central longitudinal axis of the cylinder coincides with the central longitudinal axis of the tool insert 18. The danger area begins on the front side of the drill chuck 16 and extends beyond the end of the tool insert 18. The danger area 24 has, for example, a radius of 30 cm and extends from the end of the twist drill bit for a further 30 cm. The danger area can obviously also begin at the point where the shaft 14 emerges from the housing.

FIG. 2 shows the cylindrical shape of the danger area 24 in the front view. The inner danger area 26 has a cylindrical shape and has, for example, a radius of 15 cm and extends beyond the end of the twist drill bit for approximately a further 15 cm. The outer danger area 28 partially surrounds the inner danger area 26 and is therefore cup-shaped. The outer danger area has e.g. a radius of 30 cm. As explained, the two cameras 20, 22 have a different angle of view onto the danger area 24 and as a result can reliably monitor the danger area 24 in its spatial extension.

A further sensor 30 which is designed, for example, as an infrared sensor or as a contactlessly operating temperature sensor is provided on the housing 12 of the power hand drill. A monitoring area of the sensor 30 essentially corresponds to the danger area 24.

The image data captured by the two cameras 20, 22 and the signals from the sensor 30 are fed to an evaluation unit 32 in the housing 12. The evaluation unit is provided with image processing software and is furthermore also able to evaluate and process the signals from the sensor 30. By means of the image processing software in the evaluation unit 32, it can be determined from the image data from the two cameras 20, 22 whether a human body part is present in the danger area 24. The evaluation is carried out on the basis of pure geometry, i.e. the contours of the human body part, and/or on the basis of colour, patterns, for example patterns from fingernails or veins, on the basis of movement patterns or on the basis of a preceding calibration. For a calibration, the operator of the hand-guided tool 10 can be requested, for example, to hold his hand in the danger area 24 while the drive is not yet running in order to be able to record the contours of his hand from different angles of view.

The temperature of an object in the danger area 24, for example, can be measured with the sensor 30. If the temperature is, for example, within a range between 30° C. and 38° C., this provides strong evidence that a human body part is present, but is, for example, covered by a glove or by an item of clothing. Together with the result of the image processing of the image data from the two cameras 20, 22, it can then be reliably established whether the object in the danger area 24 is an object or is actually a human body part.

According to the invention, it is readily possible to work even with only one of the two cameras 20, 22, in other words therefore to provide the hand-guided tool 10 with one camera only. It is additionally possible according to the invention to use more than two cameras and more than one further sensor 30. High-frequency sensors, for example, and/or ultrasound sensors can be used in order to detect whether skin is present in the danger area. Suitable sensors can also, for example, penetrate clothing in order to increase the reliability of detection of a human body part.

If the evaluation and processing of the data from the cameras 20, 22 and from the sensor 30 indicate that a human body part is present in the danger area 24, this result is forwarded to a control unit 34 of the hand-guided tool 10. The control unit 34 then either outputs a warning signal, for example a visual warning signal, to a display device 36 on the upper side of the housing 34 and/or it slows down a movement of the tool insert 18 or immediately stops a movement of the tool insert 18. The control unit 34 also has a memory for storing the captured data.

A warning signal is output by the control unit 34, for example if a body part is detected only in the outer danger area 28. In addition to the output of the warning signal, a movement of the tool insert 18 can also be slowed down, for example by slowing down the drive of the power hand drill. If a direction of movement and a speed of movement of the human body part in the danger area 24 are also captured by means of the two cameras 20, 22, only a warning signal can be output if, for example, the human body part moves very slowly into the outer danger area 28. The same applies if the human body part is already moving out of the outer danger area 28 once more. Conversely, if it is detected that a human body part is moving quickly into the outer danger area 28 and possibly towards the tool insert 18, not only can the warning signal be output, but also the drive or the movement of the tool insert 18 can additionally be slowed down.

Conversely, if it is detected that a human body part is present in the inner danger area 26, the drive of the hand-guided tool 10 or a movement of the tool insert 18 is stopped immediately.

A position sensor 38, for example a GPS sensor or a sensor for determining a position of the hand-guided tool 10 inside a building, can be provided on the housing of the hand-guided tool 10. The data from this position sensor 38 can similarly be fed to the evaluation unit 32 and, if necessary, can be taken into account in the evaluation of the image data, for example by means of image processing software. However, the data from the position sensor 38 can also be used to create documentation, to record, for example, where a drill hole has been made in a wall. The date, time, rotational speed, torque and the like of the tool insert 18 can additionally be stored here, along with identification data of an operator.

The illustration in FIG. 3 shows a side view of a further hand-guided tool 40 according to the invention, shown schematically in the form of a one-hand angle grinder. The housing 12 of the angle grinder is similarly provided with two cameras 20, 22. A tool insert is designed as a grinding disc 42 for the one-hand angle grinder. In the embodiment shown, a danger area 44 is spherical and has, for example, a radius of 30 cm. An origin of the radius of the spherical danger area 44 is located, for example, at the centre of the grinding disc 42. The danger area 44 has an inner, similarly spherical danger area 46 and an outer spherical shell-shaped danger area 48.

The danger area 44 of the hand-guided tool 40 is otherwise monitored in the same way as already explained with reference to FIGS. 1 and 2.

In addition to the rotational speed, torque, date and time of the grinding disc 42, a charge level, for example, of a possibly provided battery of the hand-guided tool 40 can also be monitored.

The cameras 20, 22 can be mechanically connected to the hand-guided tool 10, 40, wherein the work steps carried out with this hand-guided tool 10, 40 can be captured with the camera 20, 22 and the danger areas 24, 44 can be monitored. However, the cameras 20, 22 can also not be connected to the hand-guided tool 10, 40, but can be positioned separately from the hand-guided tool 10, 40.

FIG. 4 shows a case 60 with a foldable or detachable lid 61 and a case main body 62 for a hand-guided tool 10, 40 as shown in FIGS. 1 to 3, or a further hand-guided tool without a camera (not shown). At least one further camera 21, 23 can be provided on the case 60, in fact separately and detached from the hand-guided tool 10, 40. The camera 21, 23 is disposed on the lid 61 of the case 60 and is positioned so that it captures the work steps carried out with the hand-guided tool 10, 40 or the hand-guided tool without a camera (not shown) and monitors the danger areas 24, 44. For this purpose, the case 60 is to be positioned at a location where the work steps are carried out with the hand-guided tool 10, 40 or the hand-guided tool without a camera (not shown). The camera 21, 23 then captures the work steps that are carried out and the danger area 24, 44 is defined around the tool insert 18 or around the grinding disc 42 or a further suitable tool by means of the image processing software and is monitored. The evaluation unit 32 is disposed near to the camera 21, 23 in the lid 61, but can also be disposed at a different location in or on the case 60. According to the invention, the evaluation unit 32 and a plurality of cameras 21, 23 can also be disposed and suitably positioned independently from a tool case.

A communication connection which is designed, in particular, wirelessly exists between the hand-guided tool 10, 40 or the hand-guided tool without a camera (not shown) and the evaluation unit 32. The camera 21, 23 is activated when the hand-guided tool 10, 40 or the hand-guided tool without a camera 20, 22 is actuated in order to monitor the danger area and, in the event of an emergency, if, for example, a human body part is present in the danger area, to generate a warning signal and/or to slow down a drive of the hand-guided tool and/or to stop the drive of the hand-guided tool.

In one design (not shown), an upstream and/or downstream monitoring of the danger area 24, 44 is provided. In this case, the hand-guided tool is not yet or is no longer in operation and is therefore deactivated. If, for example, a sharp-edged tool insert or a tool insert which is still hot and has not yet cooled down is provided in the hand-guided tool 10, 40, a danger signal or warning signal, for example, sounds as soon as a human body part is present in the danger area 24, 44.

The camera 20, 22 and/or the camera 21, 23 can monitor the danger area 24, 44 depending on the situation.

The invention claimed is:

1. Method for the emergency shutdown of hand-guided tools having a drive, wherein the hand-guided tool is connected, in particular mechanically, to at least one camera and the camera and/or the tool is provided with an evaluation unit having image processing software, comprising the following steps:

activating the camera to capture an operating environment for the hand-guided tool, wherein the operating environment is dynamic based on a position of an operating hand of the operator guiding the hand-guided tool in the operating environment, monitoring a predefined danger area of the hand-guided tool within the captured operating environment by means of the camera, processing and evaluating the captured image data by means of the evaluation unit and the image processing software with regard to the presence of a human body part in the danger area including updating the operating environment, the danger area of the hand-guided tool and the presence of a human body part based on movement of the hand-guided tool by the operating hand, and generating a warning signal and/or slowing down the drive of the hand-guided tool and/or stopping the drive of the hand-guided tool if a human body part is present in the danger area, further including creating documentation of work steps carried out with the hand-guided tool using the image data captured by means of the at least one camera, wherein at least one of the shape and the dimensions of the danger area is changed depending on a type of the tool insert of the hand guided tool.

2. Method according to claim 1, comprising capturing and processing signals from at least one further sensor on or in the hand-guided tool by means of the evaluation unit and considering the signals from the at least one further sensor in the evaluation of the captured image data with regard to the presence of a human body part in the danger area.

3. Method according to claim 2, comprising capturing and processing signals from an infrared sensor, a sensor operating with high-frequency electromagnetic radiation, an ultrasound sensor, a temperature sensor, a capacitive sensor and/or a position sensor for detecting a position of the hand-guided tool in the space.

4. Method according to claim 1, comprising monitoring the danger area with at least two cameras, in particular 3D cameras, disposed having different angles of view onto the danger area, and processing and evaluating the data from the at least two cameras by means of the evaluation unit and the image processing software.

5. Method according to claim 1, comprising activating the camera by moving the hand-guided tool and/or by activating a drive of the hand-guided tool.

6. Method according to claim 1, comprising defining a danger area in the shape of an imaginary sphere in the center of which, in particular, the tool insert of the hand-guided tool is disposed, or in the shape of an imaginary cylinder on the central longitudinal axis of which, in particular, the tool insert of the hand-guided tool is disposed.

7. Method according to claim 1, comprising subdividing the danger area into an inner danger area and an outer danger area and generating a warning signal and/or slowing down the drive if a human body part is present in the outer danger area and shutting down the drive of the hand-guided tool if a human body part is present in the inner danger area.

8. Method according to claim 1, comprising considering data from at least one further sensor, in particular a position sensor for detecting a position of the hand-guided tool in the space, data from the hand-guided tool, in particular the device number, rotational speed, torque, type and dimensions of a tool insert of the hand-guided tool, and/or data from an operator of the hand-guided tool in the creation of the documentation.

9. Hand-guided tool having a drive, comprising
at least one camera connected, in particular mechanically, to the hand-guided tool to capture an operating environment for the hand-guided tool, wherein the operating environment is dynamic based on a position of an operating hand of the operator guiding the hand-guided tool in the operating environment, and monitor a predefined danger area of the hand-guided tool within the captured operating environment,
an evaluation unit having image processing software for processing and evaluating the captured image data by means of the evaluation unit and the image processing software with regard to the presence of a human body part in the danger area including updating the operating environment, the danger area of the hand-guided tool and the presence of a human body part based on movement of the hand-guided tool by the operating hand, and
a control unit to generate a warning signal and/or to slow down a drive of the hand-guided tool and/or to stop the drive of the hand-guided tool if a human body part is present in the danger area,
further including creating documentation of work steps carried out with the hand-guided tool using the image data captured by means of the at least one camera,
wherein at least one of the shape and the dimensions of the danger area is changed depending on the type of the tool insert of the hand guided tool.

10. Hand-guided tool according to claim 9, comprising at least one further sensor, in particular an infrared sensor, a sensor operating with high-frequency electromagnetic radiation, an ultrasound sensor and/or a position sensor to detect a position of the hand-guided tool in the space, and means for forwarding the signals from the at least one further sensor to the evaluation unit.

11. Hand-guided tool according to claim 9, comprising a memory for storing data and an interface for reading data.

12. Hand-guided tool according to claim 11 comprising a sensor for detecting the type of tool insert used with the hand-guided tool and comprising means for automatically changing at least one of the shape and dimensions of the danger area depending on the type of the tool insert detected.

13. Arrangement having a hand-guided tool according to claim 9 and at least one separate camera, wherein a communication connection exists between the hand-guided tool and the at least one separate camera and the at least one separate camera monitors a danger area of the hand-guided tool.

14. Arrangement according to claim 13, comprising a case for the hand-guided tool in which the at least one separate camera is disposed, wherein the case is positioned so that the danger area of the hand-guided tool can be monitored.

15. Method according to claim 1, further comprising activating the camera by folding out the camera.

16. Method for the emergency shutdown of hand-guided tools having a drive, wherein the hand-guided tool is connected, in particular mechanically, to at least one camera and the camera and/or the tool is provided with an evaluation unit having image processing software, comprising the following steps:
activating the camera,
monitoring a predefined danger area of the hand-guided tool by means of the camera,
processing and evaluating the captured image data by means of the evaluation unit and the image processing software with regard to the presence of a human body part in the danger area, and
generating a warning signal and/or slowing down the drive of the hand-guided tool and/or stopping the drive of the hand-guided tool if a human body part is present in the danger area,
further including creating documentation of work steps carried out with the hand-guided tool using the image data captured by means of the at least one camera,
wherein at least one of the shape and the dimensions of the danger area is changed depending on a type of the tool insert of the hand guided tool, wherein the type of the tool insert is identified by the hand-guided tool upon insertion.

17. Method for the emergency shutdown of hand-guided tools having a drive according to claim 16, wherein the danger area is defined based on the operating parameters for the inserted tool insert when used in the tool.

18. Method for the emergency shutdown of hand-guided tools having a drive, wherein the hand-guided tool is connected, in particular mechanically, to at least one camera and the camera and/or the tool is provided with an evaluation unit having image processing software, comprising the following steps:
activating the camera,
monitoring a predefined danger area of the hand-guided tool by means of the camera,
processing and evaluating the captured image data by means of the evaluation unit and the image processing software with regard to the presence of a human body part in the danger area, and
generating a warning signal and/or slowing down the drive of the hand-guided tool and/or stopping the drive of the hand-guided tool if a human body part is present in the danger area,
further including creating documentation of work steps carried out with the hand-guided tool using the image data captured by means of the at least one camera,
wherein at least one of the shape and the dimensions of the danger area is changed depending on a type of the tool insert of the hand guided tool, wherein the type of the tool insert is identified using the camera of the hand-guided tool.

* * * * *